United States Patent [19]

Kohl et al.

[11] 4,083,930
[45] Apr. 11, 1978

[54] METHOD OF TREATING ALKALI METAL SULFIDE AND CARBONATE MIXTURES

[75] Inventors: Arthur L. Kohl, Woodland Hills; Robert D. Rennick; Martin W. Savinsky, both of Thousand Oaks, all of Calif.

[73] Assignee: Rockwell International Corporation, El Segundo, Calif.

[21] Appl. No.: 673,226

[22] Filed: Apr. 2, 1976

[51] Int. Cl.² .................. C01D 7/00; C01D 17/16; D21C 11/00

[52] U.S. Cl. .................................. 423/189; 423/421; 423/428; 423/563; 423/DIG. 3; 162/36

[58] Field of Search .................. 423/179–209, 423/421, 422, 427, 428, 563, 566; 162/36

[56] References Cited

U.S. PATENT DOCUMENTS

| | | | |
|---|---|---|---|
| 2,496,550 | 2/1950 | Larsson et al. | 423/189 |
| 2,656,245 | 10/1953 | Gray et al. | 423/DIG. 3 |
| 2,675,297 | 4/1954 | Gray et al. | 423/428 |
| 2,800,388 | 7/1957 | Ahlborg et al. | 423/206 X |
| 2,841,561 | 7/1958 | Gray et al. | 423/183 X |
| 2,864,669 | 12/1958 | Ahlborg et al. | 423/202 |
| 3,210,235 | 10/1965 | Ferrigaw, Jr. et al. | 423/183 X |
| 3,331,732 | 7/1967 | Venemark | 423/182 |
| 3,508,863 | 4/1970 | Kiminki et al. | 423/189 |
| 3,826,710 | 7/1974 | Anderson | 423/233 X |
| 3,841,961 | 10/1974 | Saiha | 423/209 X |

Primary Examiner—O. R. Vertiz
Assistant Examiner—Gary P. Straub
Attorney, Agent, or Firm—L. Lee Humphries; Henry Kolin; Clark E. DeLarvin

[57] ABSTRACT

A method of removing and preferably recovering sulfur values from an alkali metal sulfide and carbonate mixture comprising the steps of (1) introducing the mixture in an aqueous medium into a first carbonation zone and reacting the mixture with a gas containing a major amount of $CO_2$ and a minor amount of $H_2S$; (2) introducing the resultant product from step 1 into a stripping zone maintained at subatmospheric pressure, and contacting this product with steam to produce a gaseous mixture, comprising $H_2S$ and water vapor, and a liquor of reduced sulfide content; (3) introducing the liquor of reduced sulfide content into a second carbonation zone, and reacting the liquor with substantially pure gaseous $CO_2$ in an amount sufficient to precipitate bicarbonate crystals and produce an offgas containing $CO_2$ and $H_2S$ for use in step 1; (4) recovering the bicarbonate crystals from step 3, and thermally decomposing the crystals to produce an alkaline metal carbonate product and a substantially pure $CO_2$ offgas for use in step 3.

12 Claims, 2 Drawing Figures

METHOD OF TREATING ALKALI METAL SULFIDE AND CARBONATE MIXTURES

BACKGROUND OF THE INVENTION

1. Field of the Invention

This invention pertains to the removal of sulfur values in the treatment of alkali metal sulfide and carbonate mixtures. It particularly relates to a method wherein the alkali metal sulfide is converted to the corresponding alkali metal carbonate and the sulfur is recoverable as a salable product. In a particularly preferred aspect, the invention relates to the treatment of a melt comprising a mixture of alkali metal sulfide and carbonate, the melt being obtained from a process wherein a carbonaceous material, such as coal, is reacted in a molten alkali metal carbonate bath.

2. Prior Art

There are several sources of mixed alkali metal salts such as, for example, mixtures of alkali metal sulfides and carbonates, which advantageously are treated to recover the sulfur content and produce a substantially pure alkali metal carbonate. One such source is the pulp and paper industry, wherein a cellulose is manufactured by digestion of wood with alkali metal sulfides or sulfite. In such a process a bleed stream digestion liquor is drawn off, concentrated and burned producing a molten salt mixture which generally consists substantially of sodium carbonate and sodium sulfide. Various methods have been suggested for treating such molten salts.

More recently, it has been suggested that carbonaceous materials such as coal, coal tar, oil shale, petroleum coke, and petroleum residuums, be decomposed in a molten alkali metal carbonate bath to recover the resultant valuable gaseous products. The feed materials generally contain sulfur compounds, which react with and are retained in the molten bath. In addition, such materials, particularly in the case of coal, also contain significant amounts of inorganic ash constituents, which also are retained in the molten bath. Therefore, it is necessary to periodically (or continuously) remove a portion of the molten alkali metal carbonate bath and treat it to remove the retained ash constituents and sulfur, and permit the return of alkali metal carbonate to the bath for further use.

In U.S. Pat. No. 2,094,070, Hultman et al., there is disclosed a process for recovering $H_2S$ from gases. Broadly, the process comprises contacting an $H_2S$-containing gas stream with a solution of alkali metal carbonate, which absorbs the hydrogen sulfide. The solution then is treated with a sufficient amount of carbon dioxide to convert the carbonate into bicarbonate without removal of the hydrogen sulfide. The treated solution is boiled under a vacuum to expel the hydrogen sulfide and steam. The boiling is then continued at a higher temperature and pressure to convert the bicarbonate back to the carbonate for recycle to absorb more $H_2S$.

U.S. Pat. No. 2,496,550, Larsson et al., discloses a process for the recovery of alkali metal salts from the waste liquors from the production of cellulose by the digestion of the wood with an alkali metal salt such as alkali metal sulfites and bisulfates. The process comprises evaporating and burning the waste liquor to form a molten mass containing alkali and sulfur compounds followed by dissolving the molten mass in a solvent. Thereafter carbon dioxide is introduced into the solution to form alkali metal bicarbonate in an amount sufficient to approach the limit of solubility of the bicarbonate in the solution. The solution is then heated to eliminate the hydrogen sulfide formed therein. After removal of the hydrogen sulfide, the solution is treated with additional carbon dioxide to crystallize alkali bicarbonate, which is recovered from the solution. Larsson et al further suggest that the solution, after removal of the alkali metal bicarbonate, be used as the solvent for dissolving the molten mass formed from burning the waste liquor.

U.S. Pat. No. 2,675,297, Gray et al., relates to the treatment of aqueous solutions of sodium sulfide for conversion of the sulfides to salts of carbonic acid and the liberation of hydrogen sulfide. Patentees suggest subjecting a solution containing sodium sulfide to a plurality of carbonaceous treatments with gaseous carbon dioxide at an elevated temperature and pressure, each carbonation treatment being followed by steam stripping under a vacuum to remove volatile hydrogen sulfide in a concentrated form, thereby producing a solution having an enhanced content of sodium salts of carbonic acid substantially free from sulfide.

In U.S. Pat. No. 3,567,377, Lefrancois et al, there is disclosed a process for the recovery of sulfur values from sulfur-bearing materials. In accordance with the process disclosed therein, a sulfur-containing carbonaceous material is contacted in the presence of a reducing gas with a molten medium comprising an alkali metal carbonate to convert the sulfur to an alkali metal sulfide. The molten medium containing the absorbed alkali metal sulfide is mixed with an aqueous solution of the acid salt of the alkali metal carbonate. The resulting solution is filtered to remove any solids contained therein and then reacted with carbon dioxide to form hydrogen sulfide as a gaseous product of the reaction.

U.S. Pat. No. 3,508,863, Kiminki et al, discloses a process for the preparation of sodium carbonate monohydrate from a soda smelt solution. The process is directed toward the treatment of a smelt solution arrived at by burning spent pulping liquor. The smelt solution is precarbonated with gases containing carbon dioxide to form dissolved sodium bicarbonate followed by evaporation of the precarbonated solution together with added sodium bicarbonate to remove all the sulfides as hydrogen sulfide together with water vapor and to form crystalline sodium carbonate monohydrate for recovery.

Other patents relating to the treatment of alkali metal sulfides are U.S. Pat. Nos. 1,945,163 (Rosenstein et al.); 2,730,445 (Sivola); 3,438,728 (Grantham); 3,574,543 (Heredy); and 3,867,514 (Moore).

While each of the foregoing processes offer certain advantages, none has proven entirely satisfactory. Some are disadvantageous in that a multitude of steps are required. In others no provision is made for obtaining the necessary carbon dioxide from the process itself, thus raising the operating cost, while others create difficulties owing to corrosion and very high amounts of gases to be handled. Several of the processes require use of excessive amounts of steam, and others require use of heat exchangers which are subject to plugging and scaling due to the deposition of solid materials from solution. A further disadvantage common to several of the foregoing processes is that the recovered alkali metal carbonate is not obtained in a substantially pure form and contains sulfates and sulfides. In still others, noxious sulfur-containing gases are evolved to the atmosphere. Obviously, therefore, there is still a need for an improved economical process for the treatment of mixtures of alkali metal sulfides and carbonates for the removal of sulfur values therefrom.

SUMMARY OF THE INVENTION

In accordance with the present invention there is provided an efficient, economically viable, non-polluting method of treating an alkali metal sulfide and carbonate mixture to convert the alkali metal sulfide to carbonate and remove and preferably recover the sulfur constituent as a salable product. Broadly, the method comprises the sequential steps of introducing the mixture in an aqueous medium into a first carbonation zone and reacting said mixture with a gas containing a major amount of $CO_2$ and a minor amount of $H_2S$, the gas being advantageously obtained from a subsequent step. The resultant product obtained from the first step then is introduced into a stripping zone maintained at subatmospheric pressure, where it is contacted with steam to produce a gaseous mixture, comprising $H_2S$ and water vapor, and a liquor of reduced sulfide content. The liquor of reduced sulfide content is introduced into a second carbonation zone and reacted with substantially pure gaseous $CO_2$ to precipitate bicarbonate and produce an offgas containing a major amount of $CO_2$ and a minor amount of $H_2S$ for use in the first step. The bicarbonate crystals are recovered and thermally decomposed to produce an alkali metal carbonate product and a substantially pure $CO_2$ offgas for use in the second carbonation zone.

In accordance with one embodiment of the invention a substantial excess of $CO_2$ is introduced into the second carbonation zone, and a bleed stream of the offgas produced is withdrawn, cooled, and recycled to the second carbonation zone.

In accordance with another embodiment of the invention the alkali metal sulfide-carbonate mixture contains an impurity (such as is typically found in coal) selected from the group consisting of aluminum and silicon oxide salts of the alkali metal. In accordance with the present invention, the impurity is removed intermediate the first and second carbonation steps.

The method is applicable to either mixed alkali metal salts, such as a mixture of sodium and potassium carbonates and sulfides, or a single alkali metal. The particularly preferred alkali metal is sodium, because of the lower solubility of the sodium bicarbonate in solution. Potassium bicarbonate has a higher solubility and therefore is less preferred. Rubidium and cesium are not preferred in view of their high cost. The present method is not readily amenable to the treatment of a lithium sulfide and carbonate mixture, since the carbonates of lithium are relatively insoluble.

DETAILED DESCRIPTION OF THE INVENTION

For convenience, the following description is directed to a particularly preferred embodiment wherein the sulfide carbonate mixture is obtained as a bleed stream from a process wherein a carbonaceous material containing impurities, such as the ash constituents of coal, is treated in a molten alkali metal carbonate bath, and a method is provided for the removal of such constituents from the sulfide-carbonate mixture.

Figure 1:
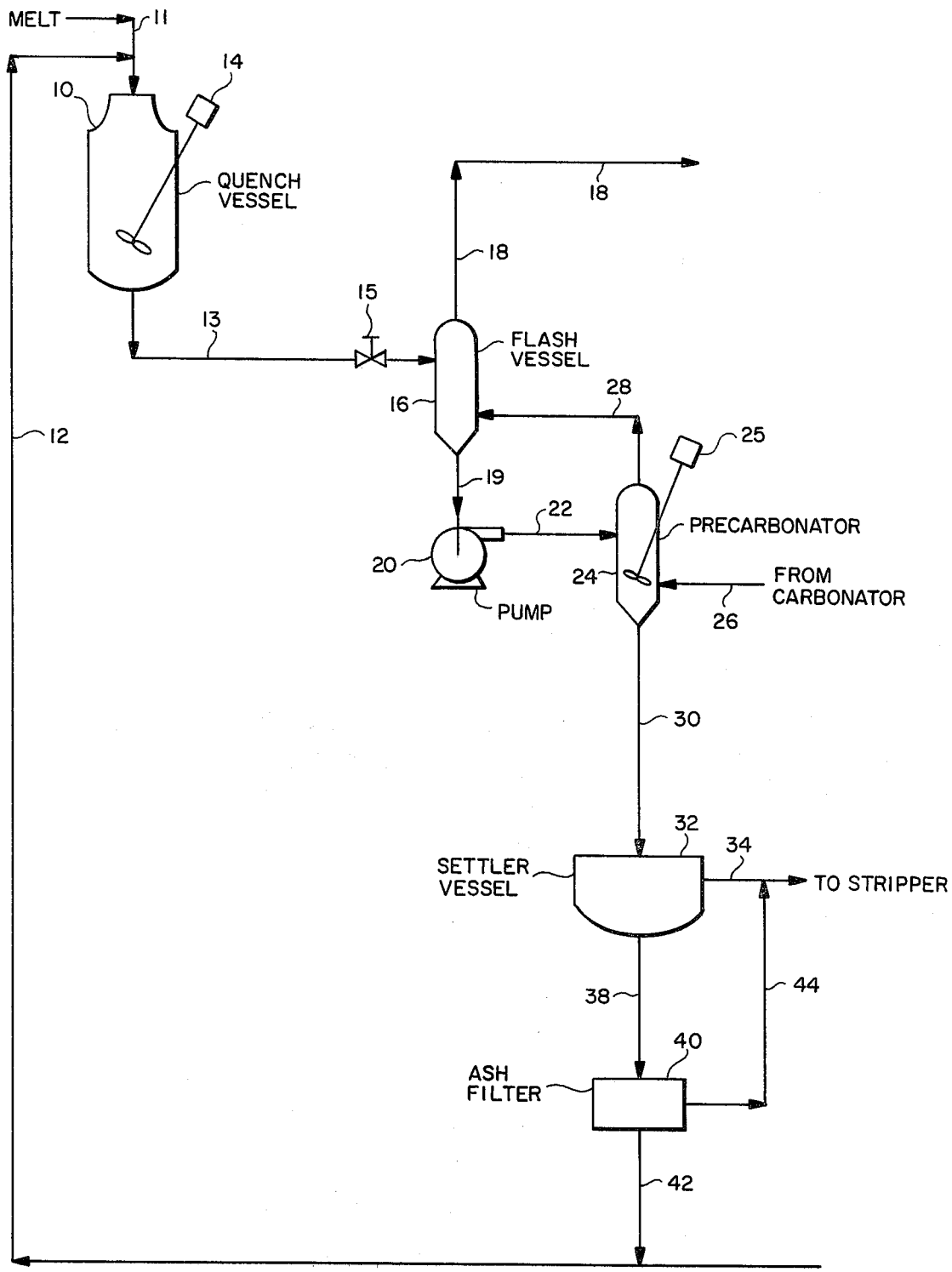
FIGS. 1 and 2 together comprise a schematic flow diagram of a method for treating an alkali metal sulfide and carbonate mixture in accordance with the present invention.
Figure 2:
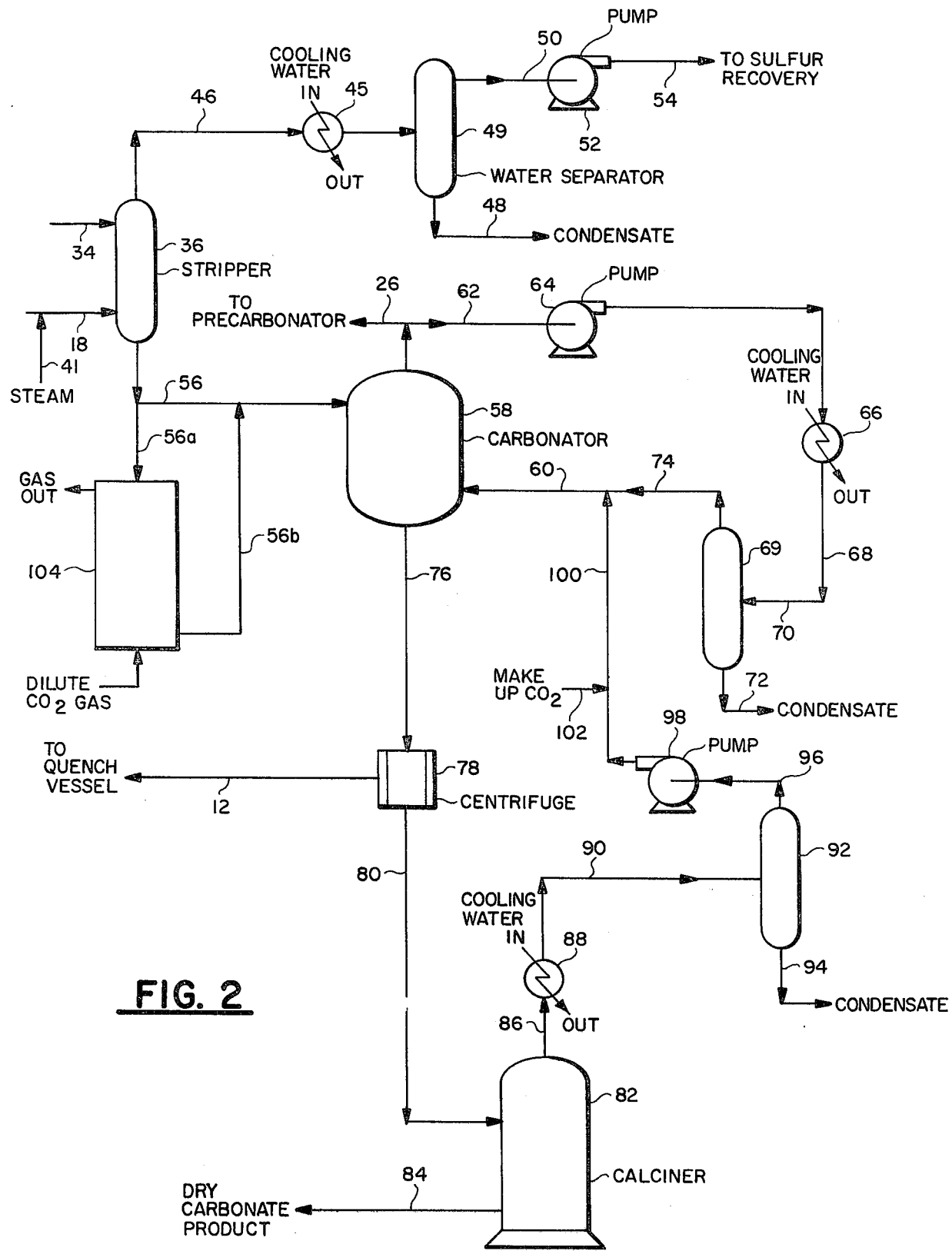

Referring to FIGS. 1 and 2 and FIG. 1 in particular, a melt, obtained from a process wherein coal is treated in a molten alkali metal carbonate mixture (an example of which is disclosed in U.S. Pat. No. 3,916,617, Process for Production of Low Btu Gas, assigned to the assignee of the present invention), is introduced into a quench vessel 10, through a conduit 11. The melt principally comprises sodium carbonate and contains from 1 to 25 wt.% sodium sulfide and from 1 to about 25 wt.% of the ash constituents of the coal. The ash constituents are present principally as silicon and aluminum oxide salts of sodium. The ash will also generally include lesser amounts of other metals such as iron, which may be present in the form of either sodium oxide compounds or sulfides.

The melt is quenched in an aqueous medium comprising from about 0 to 10 wt.% sodium carbonate and from about 5 to 15 wt.% sodium bicarbonate, which is introduced into the quench vessel 10 through a conduit 12. The pressure and temperature maintained within the quench vessel are not particularly critical, provided, however, that the quench vessel is maintained at a pressure above atmospheric for reasons that will be explained more clearly later. Generally, the pressure will be within the range of from about 2 to 200 atmospheres and with a pressure of from about 5 to 50 atmospheres being preferred.

The aqueous medium is introduced into the quench vessel 10 in an amount sufficient to maintain the mixture of melt and aqueous medium below its boiling point under the pressure conditions existing within the vessel. The introduction rate of aqueous medium generally will be sufficient to provide sodium bicarbonate in an amount of from about 0.3 to 0.8 lb of bicarbonate per lb of melt and sufficient water to completely dissolve the soluble constituents of the resulting mixture. The principal desired reactions taking place in the quench vessel are represented by the general exemplary formulas:

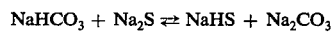

$NaHCO_3 + Na_2S \rightleftarrows NaHS + Na_2CO_3$

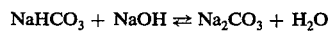

$NaHCO_3 + NaOH \rightleftarrows Na_2CO_3 + H_2O$

Another purpose of quenching in the bicarbonate solution is that the bicarbonate is believed to assist in the conversion of the soluble coal ash constituents to an insoluble oxide form by reactions such as:

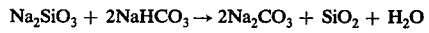

$Na_2SiO_3 + 2NaHCO_3 \rightarrow 2Na_2CO_3 + SiO_2 + H_2O$

Advantageously, the quench vessel also is provided with an agitator 14 to break up the melt and assure a substantially uniform mixture within the vessel.

The aqueous mixture of melt is withdrawn via a conduit 13 and introduced through a restriction, for example, a valve 15 into a flash vessel 16, which is maintained at a reduced pressure, i.e., a pressure substantially below that maintained within the quench vessel. Preferably, the pressure within the flash vessel 16 is maintained near atmospheric; for example, from about 0.5 to 1.5 atm. The abrupt drop in pressure within the flash vessel results in the formation of water vapor or steam, which leaves via a conduit 18 and, further, cools the aqueous melt mixture, which leaves via a conduit 19, a pump 20, and through a conduit 22 to a precarbonator 24 which is provided with an agitator such as a stirrer 25.

In precarbonator 24 the aqueous mixture of melt is contacted with a gas stream containing a major amount of $CO_2$ and a minor amount of $H_2S$, obtained from a source to be described, via conduit 26. The principal reactions taking place in precarbonator 24 are exemplified by the following equations:

I $\quad Na_2CO_3 + CO_2 + H_2O \rightleftarrows 2NaHCO_3$

II $\quad 2Na_2S + CO_2 + H_2O \rightleftarrows 2NaHS + Na_2CO_3$

III $\quad NaHS + CO_2 + H_2O \rightleftarrows NaHCO_3 + H_2S$

IV $\quad H_2S + Na_2CO_3 \rightleftarrows NaHS + NaHCO_3$

The $CO_2$-and $H_2S$-containing gas stream is introduced in an amount sufficient to reduce the alkalinity of the solution to a pH within the range of from about 9 to 10.5 and preferably about 9.5, such that the right-hand direction of reactions I and II is favored, and the major amount of the $CO_2$ is reacted. Also, by controlling the pH within such range, reactions III and IV occur substantially simultaneously such that the $H_2S$ liberated in step III is reacted with the solution in accordance with reaction IV. The amount of $CO_2$-containing gas introduced should be less than that which would cause precipitation of any significant amount of bicarbonate crystals. Following the precarbonation, it has been found that the major amount of the coal ash constituents is readily removable as an insoluble precipitate. By contrast, prior to the precarbonation, many of the ash constituents are soluble and form a semi-solid gelatinous slime which is difficult to remove and tends to plug most filtration equipment. The exact mechanism by which the ash constituents are converted to a readily filterable precipitate is not known with certainty. It is believed, however, that the bicarbonate and/or $CO_2$ breaks up the alkali metal-ash complex forming insoluble precipitates such as $SiO_2$.

The offgases from precarbonator 24 leave through a conduit 28 and are introduced into flash vessel 16. Advantageously, any unreacted $CO_2$ or $H_2S$ constituents are contacted with additional solution and further scrubbed to ensure substantially complete utilization of the $CO_2$ content of the gas. The precarbonated liquor formed in precarbonator 24 principally comprises $H_2O$, $Na_2CO_3$, NaHS, $NaHCO_3$ and may contain minor amounts of sodium sulfate, sulfite, or other salts.

The precarbonated liquor leaves via a conduit 30 and is introduced into a settler vessel 32 to permit the insolubles such as the ash constituents and any unreacted carbonaceous material to settle to the bottom of the vessel. Advantageously, the settler vessel is sized to provide an average liquor residence time of from about 2 to 4 hours to ensure substantially complete conversion of the ash constituents to an insoluble precipitate. A clarified liquor, substantially solids free, is withdrawn via a conduit 34 and introduced into a stripper vessel 36. A slurry of the solids and liquor is withdrawn from vessel 32 via a conduit 38 and introduced into a solids removal means such as an ash filter 40, which may be a centrifuge, conventional filter, or the like. The solids, principally ash, are removed for disposal, and a filtrate of substantially solids-free clarified liquor is withdrawn for introduction into the stripper vessel via conduits 44 and 34. A portion of the filtrate and particularly any portion combined with added water used to wash the filter cake may be returned to the quench vessel 10 via conduits 42 and 12.

Referring to FIG. 2, the clarified liquor is contacted in a stripper vessel 36 with the steam obtained from flash vessel 16 via conduit 18. Additional steam may be added as required via a conduit 41. It is an advantage of the present invention that the major portion of the steam requirements are provided by the steam obtained from flash vessel 16. Indeed, depending upon the precise operating conditions, it is possible to obtain all of the steam required from vessel 16. The stripper vessel is maintained at subatmospheric pressure preferably from about 0.2 to 0.8 atmospheres, the reduced pressure favoring the principal reaction taking place therein as represented by the following equation:

$NaHCO_3 + NaHS \rightleftarrows Na_2CO_3 + H_2S$

The steam introduced acts as a carrier for the $H_2S$ and also provides a source of heat to the clarified liquor, which further enhances the foregoing desired reaction. A mixture consisting principally of steam, $H_2S$, and $CO_2$ is withdrawn from stripper 36 via a conduit 46. This mixture generally is very low in $H_2S$. However, the principal constituent is water. Thus, the mixture preferably is passed through a cooling means 45 wherein a major portion of the steam is condensed and then into a water separator vessel 49. In vessel 49 a substantial portion of the steam is collected as condensed water and removed via a line 48 for disposal. The effluent gas stream from vessel 49 now comprises a gaseous stream which is rich in $H_2S$. Generally, it will contain from 25 to 95% by volume $H_2S$. The $H_2S$ rich gas stream is removed via a conduit 50 and a pump 52 (which maintains subatmospheric pressure in stripper 36) and discharged via a conduit 54 for sulfur recovery, for example, in a conventional Claus plant.

The stripped liquor from vessel 36 is withdrawn via a conduit 56 and introduced into a carbonator vessel 58, where it is contacted with the substantially pure $CO_2$ gas stream via a conduit 60 from a source to be described. The $CO_2$-containing gas is introduced in an amount in excess of that required to convert any remaining carbonate to bicarbonate. The temperature within the carbonation zone in vessel 58 is maintained at a level whereby the $CO_2$ is absorbed and a slurry of bicarbonate crystals is formed therein.

In accordance with the present invention, one means by which the temperature is maintained at a relatively low level is by withdrawing a gaseous effluent from the carbonator 58 via a conduit 62 and a pump 64, the effluent then being passed through a cooling means 66 to cool the gas and also condense a part of the moisture contained therein. The cooled gas then passes through a conduit 68 and into a water separator 69 via a conduit 70, where the condensed moisture is collected and removed via a conduit 72. The cooled gas is then returned to carbonator 58 via conduits 74 and 60. Another stream of the gas withdrawn from carbonator 58 passes through line 26, where it serves as the source of gas introduced into the precarbonator 24.

A slurry of the bicarbonate crystals formed in vessel 58 is withdrawn via a conduit 76, and the crystals are separated from the mother liquor by a separation means such as a centrifuge 78, or any of the other various crystal recovery apparatus known in the art. A bicarbonate crystal cake is withdrawn from centrifuge 78 via a conduit 80 and introduced into a thermal decomposing vessel, which may be, for example, an indirectly heated calciner 82. Bicarbonate crystal-free liquor is returned via conduit 12 to quench vessel 10 for admixture with additional melt.

In calciner 82, the bicarbonate cake is heated to a temperature sufficient to decompose the bicarbonate and form the desired carbonate product, which is withdrawn via a conduit 84. Usually a temperature of from about 220° to 500° F is sufficient, with a temperature of from 250° to 400° F being preferred. The decomposition of the bicarbonate cake also produces a gaseous effluent stream comprising a mixture of water vapor and substantially pure $CO_2$. The gaseous effluent is withdrawn from calciner 82 via a conduit 86 and advantageously passed through a cooling means 88, where it is cooled to condense a substantial portion of the moisture content. The effluent from cooling means 88 is introduced via a conduit 90 into a water separator vessel 92, wherein the condensate is collected and removed via a conduit 94. The effluent gas stream, principally consisting of $CO_2$ and a minor amount of water vapor, is withdrawn via a conduit 96 through a pump 98 and returned to the carbonator via conduits 100 and 60. Makeup $CO_2$ is added as required from a source, not shown, via a conduit 102.

Generally, when makeup $CO_2$ is added, for example, through conduit 102, it is added as a substantially pure gas. There may be occasions, however, when there is a dilute source of a $CO_2$-containing gas available. For example, when the present method is practiced in conjunction with a coal gasification process, the gaseous hydrocarbon product also contains small amounts of $CO_2$ generally from about 2 to 35% by volume. In such instances, it may be desirable to use that $CO_2$ rather than purchase pure $CO_2$. When such a dilute gas stream is available, it advantageously is introduced by absorption into the aqueous solution at a point in the process where the solution is highly alkaline. Two such points are by way of conduits 22 and 56. When $CO_2$ is absorbed by the solution in conduit 22, the load on precarbonator 24 is reduced, while when $CO_2$ is absorbed by the solution in conduit 56, the $CO_2$ absorption load of the carbonator 58 is reduced.

The latter is the preferred option and is illustrated in FIG. 2. An absorption step is added intermediate the stripper 36 and the carbonator vessel 58. For example, referring now to FIG. 2 of the drawing, below stripper vessel 36 is depicted a $CO_2$ absorber vessel 104. A product gas stream from a coal gasification process is introduced into a lower portion of the vessel from a source not shown. The product gas stream, scrubbed of its $CO_2$ content, exits from the upper portion of the vessel. The stripped liquor is withdrawn from stripper 36, introduced into the upper portion of the $CO_2$ absorber vessel 104 through a conduit 56a and withdrawn from a lower portion of the vessel through a conduit 56b for introduction into carbonator vessel 58. This optional arrangement provides a two-fold advantage in that (1) it eliminates the necessity of purchasing makeup $CO_2$, and (2) it also enhances the value of the coal gasification product gas by removing the inert $CO_2$ constituents therefrom. This step is preferably carried out at a pressure above atmospheric, for example, 2 to 30 atmospheres, in order to enhance the absorption of $CO_2$.

The method of the present invention will be more readily understood by reference to the following example. It is to be understood that this example is in no way to be construed as limiting the scope of the present invention. It is presented principally to show in detail certain embodiments and advantages of the method.

EXAMPLE

This example illustrates the method of the present invention as applied to a molten mixture of sodium sulfide and carbonate obtained from a coal gasification process. A melt comprising about 31.8 #moles/hr of sodium carbonate, 7.81 #M/hr of sodium sulfide, 14.6 #M/hr of carbon and 1674 #/hr of ash constituents, including a mixture of the sodium salts of silica and alumina among other compounds, is introduced into quench vessel 10. Under substantially steady state conditions, the flowrates and compositions of the various streams are found to be as set forth in the Tables 1 and 2 below, wherein the stream number refers to the corresponding numerical designation in FIGS. 1 and 2.

From Tables 1 and 2 numerous benefits obtainable in accordance with the present invention will be observed. More particularly, referring to Table 2, stream Nos. 18 and 40, it will be seen that substantially all the steam required for use in the subsequent stripping operation is obtained from flash vessel 16, and less than 20% of the total is obtained from outside the system. Further, referring to streams 96 and 102 in that table, it is seen that most of the carbon dioxide required in the process is obtained from calciner 82, with less than about 30% of the total requirement being obtained from an outside source. Further, referring to stream 46, the offgas from stripper 36, it is seen that the offgas consists essentially of water vapor $H_2S$, and a small amount of $CO_2$. Specifically, less than about 2.6 #M/hr of $CO_2$ are lost from the system, as compared to a total of about 75 #M/hr introduced into the carbonator system via line 100, thus clearly demonstrating very high utilization of $CO_2$. Another advantage of the method of the present invention is that the sodium carbonate product is obtainable in a substantially pure dry form. Specifically, analysis of the sodium carbonate product shows that it is 98% pure, the minor amount of impurities consisting essentially of sulfates and coal ash constituents.

Table 1

| | | LIQUID AND SOLIDS FLOWS | | | | | |
|---|---|---|---|---|---|---|---|
| Stream | Description | Steady State Flow GPM | $Na_2CO_3$ #Moles/hr | $NaHCO_3$ #M/hr | NaHS #M/hr | $CO_2$ #M/hr | Carbon #M/hr | Insol. "Ash" #/hr |
| 12 | Dissolver Feed | 54.1 | 0.90 | 31.26 | 1.44 | 32.16 | | |
| 14 | Green Liquor Slurry | 62.8 | 63.99 | — | 9.25 | 63.99 | 14.63 | 1674 |
| 19 | Flashed G.L.S. | 46.6 | 63.99 | — | 9.25 | 63.99 | 14.63 | 1674 |
| 30 | Precarbonated Slurry | 46.6 | 58.03 | 14.06 | 7.11 | 72.09 | 14.63 | 1674 |
| 34 | Settler Overflow | 34.5 | 45.57 | 11.04 | 5.58 | 56.61 | — | — |
| 38 | Settler Underflow | 12.1 | 12.46 | 3.02 | 1.53 | 15.48 | 14.63 | 1674 |

Table 1-continued

LIQUID AND SOLIDS FLOWS

| Stream | Description | Steady State Flow GPM | $Na_2CO_3$ #Moles/hr | $NaHCO_3$ #M/hr | NaHS #M/hr | $CO_2$ #M/hr | Carbon #M/hr | Insol. "Ash" #/hr |
|---|---|---|---|---|---|---|---|---|
| 42 | Wash Return | 4.33 | 0.01 | 0.07 | — | 0.08 | — | — |
| 44 | Ash Filtrate | 14.2 | 12.30 | 3.31 | 1.55 | 5.61 | — | — |
| 56 | Stripped Liquor | 48.6 | 65.78 | 3.84 | 1.82 | 69.62 | — | — |
| 76 | Product Slurry | 49.3 | 0.99 | 133.80 | 1.43 | 134.79 | — | — |
| 80 | Bicarbonate | (Solids) | 0.02 | 102.69 | 0.07 | 102.71 | — | — |
| 84 | Sodium Carbonate | (Solids) | 51.36 | 51.36 | — | 51.36 | — | — |

Table 2

GASES

| Description | Flow scfm* | Total #M/hr | $CO_2$ #M/hr | $H_2S$ #M/hr | $H_2O$ #M/hr | Temp. °F | Pressure psia |
|---|---|---|---|---|---|---|---|
| 18 Flashed Steam | 1841 | 291.12 | — | — | 291.12 | 160 | 5 |
| 26 Carbonator Bleed Gas | 69 | 10.84 | 8.10 | 0.46 | 2.28 | 220 | 23.7 |
| 28 Precarbonator Vent | — | — | — | — | — | 165 | 14.7 |
| 40 Process Steam | 318 | 50.22 | — | — | 50.22 | 298 | 64.7 |
| 46 Stripper Exhaust | 2236 | 353.56 | 2.60 | 5.31 | 345.65 | 158 | 4 |
| 50 Claus Feed | 58 | 9.11 | 2.60 | 5.21 | 1.30 | 90 | 15 |
| 60 Carbonation Feed Gas | 4244 | 670.93 | 618.79 | 31.04 | 21.10 | 90 | 20 |
| 62 Recirculating Gas | 4618 | 730.16 | 545.42 | 30.97 | 153.77 | 220 | 23.7 |
| 96 Calciner Return | 340 | 53.81 | 51.22 | 0.07 | 2.52 | 90 | 16+ |
| 102 Makeup $CO_2$ | 140 | 22.13 | 22.13 | — | — | 40 | 100+ |

*1 #Mole = 379.5 scfm 60° F and 12 atm.

While certain exemplary reactions have been described with respect to the individual steps of the present method, it will be appreciated that the actual mechanism of each reaction is highly complex, and several competing reactions may occur simultaneously. Further, even where the desired reactions do not go to completion, and products are also produced by competing or undesired side reactions, the unreacted or undesired products are recycled in the process without substantial interference with the basic method. Thus, while the example illustrating this invention has been described with respect to specific concentrations, time, temperature, pressure, and other specific reaction conditions, the invention may be otherwise practiced as will be readily apparent to those skilled in this art. Accordingly, this invention is not to be limited by the illustrative and specific embodiments thereof, but its scope should be determined in accordance with the following claims.

What is claimed is:

1. A method of treating an alkali-metal sulfide and carbonate mixture, said alkali metal being selected from the group consisting of sodium, potassium, rubidium and cesium, comprising the steps of:
   (a) introducing a molten mixture of said alkali metal sulfide and carbonate into an aqueous medium in a quenching zone maintained at a pressure of from about 2 to 200 atmospheres to produce a hot solution of said carbonate and sulfide;
   (b) withdrawing said solution from step (a) and introducing it into a zone of reduced pressure whereby there is produced water vapor;
   (c) withdrawing said solution from step (b) and introducing it into a first carbonation zone and contacting said solution with a gas containing a major amount of $CO_2$ and a minor amount of $H_2S$ in an amount sufficient to produce bisulfide and bicarbonate in said solution, said gas being obtained from step (f);
   (d) withdrawing said solution from said first carbonation zone and introducing it into a stripping zone maintained at from about 0.2 to 0.8 atmospheres where it is contacted with water vapor obtained from (b) to produce a gaseous stream comprising $H_2S$ and water vapor and a solution of reduced alkali metal sulfide content;
   (e) withdrawing said solution from said stripping zone and introducing it into a second carbonation zone and reacting it with substantially pure gaseous $CO_2$ to precipitate bicarbonate crystals and produce an offgas containing a major amount of $CO_2$ and a minor amount of $H_2S$;
   (f) recovering said offgas from said second carbonation zone for use in said first carbonation zone;
   (g) removing the bicarbonate crystal-containing solution from said second carbonation zone and recovering the crystals to produce a substantially crystal-free solution; and
   (h) thermally decomposing the recovered crystals from step (g) to produce an alkali metal carbonate product, and a substantially pure $CO_2$ offgas for use in the second carbonation zone.

2. The method of claim 1 wherein in step (c) there is produced a waste gas stream which is introduced into the stripping zone of step (d).

3. The method of claim 1 wherein said alkali metal sulfide and carbonate mixture includes at least one impurity selected from the group consisting of aluminum and silicon oxide salts of the alkali metal and said impurity is removed intermediate steps (c) and (d).

4. The method of claim 1 wherein said alkali metal is sodium.

5. The method of claim 1 wherein a substantial excess of $CO_2$ is introduced into step (e) and a bleed stream of the offgas is withdrawn, cooled, and recycled to step (e).

6. The method of claim 1 wherein the liquor from step (d) is introduced into a third carbonation zone and reacted with a gaseous stream containing a relatively low concentration of carbon dioxide at a pressure above atmospheric before it is introduced into the second carbonation zone of step (e).

7. The method of claim 1 wherein said substantially crystal free solution from step (g) is used as the aqueous medium in step (a).

8. The method of claim 7 wherein in step (c) there is produced a waste gas stream which is introduced into the stripping zone of step (d).

9. The method of claim 8 wherein said alkali metal sulfide and carbonate mixture includes at least one impurity selected from the group consisting of aluminum and silicon oxide salts of the alkali metal and said impurity is removed intermediate steps (c) and (d).

10. The method of claim 9 wherein said alkali metal is sodium.

11. The method of claim 10 wherein a substantial excess of $CO_2$ over that required to react with all of the alkali metal carbonate to form alkali metal bicarbonate is introduced into step (3), and a bleedstream of the offgas is withdrawn, cooled and recycled to step (e).

12. The method of claim 11 wherein in step (d) the gaseous mixture comprising $H_2S$ in water vapor is cooled to condense a major portion of the water vapor and produce a gas comprising 25 to 95% by volume $H_2S$.

* * * * *

UNITED STATES PATENT AND TRADEMARK OFFICE
CERTIFICATE OF CORRECTION

PATENT NO. : 4,083,930

DATED : April 11, 1978

INVENTOR(S) : Arthur L. Kohl et al

It is certified that error appears in the above-identified patent and that said Letters Patent are hereby corrected as shown below:

Front Page, under [56] References Cited, "Ferrigaw, Jr. et al" should read --Ferrigan, Jr. et al--.

Column 1, between the title and BACKGROUND OF THE INVENTION, insert:
--CONTRACTUAL ORIGIN OF THE INVENTION The Government has rights in this invention pursuant to Contract No. E(49-18)-1529 (formerly 14-32-0001-1529) with the U. S. Department of Energy.--

Columns 9-10, in Table 1-continued, under the heading $CO_2$, "5.61" should read --15.61--;
in the footnote to Table 2, "12 atm." should read --1 atm.--.

Column 12, line 6, in Claim 11, "step (3)" should read --step (e)--.

Signed and Sealed this

Twelfth Day of May 1981

[SEAL]

Attest:

RENE D. TEGTMEYER

Attesting Officer     Acting Commissioner of Patents and Trademarks